Jan. 15, 1924.

C. BROWN 1,480,542

PROCESS OF POLISHING GLASS

Filed Nov. 7, 1919

INVENTOR
Christopher Brown
by James C. Bradley
Atty.

Patented Jan. 15, 1924.

1,480,542

UNITED STATES PATENT OFFICE.

CHRISTOPHER BROWN, OF CHARLEROI, PENNSYLVANIA, ASSIGNOR TO PITTSBURGH PLATE GLASS COMPANY, A CORPORATION OF PENNSYLVANIA.

PROCESS OF POLISHING GLASS.

Application filed November 7, 1919. Serial No. 336,385.

*To all whom it may concern:*

Be it known that I, CHRISTOPHER BROWN, a citizen of the United States, and a resident of Charleroi, in the county of Washington and State of Pennsylvania, have made a new useful Invention in Process of Polishing Glass, of which the following is a specification.

Figure 1:
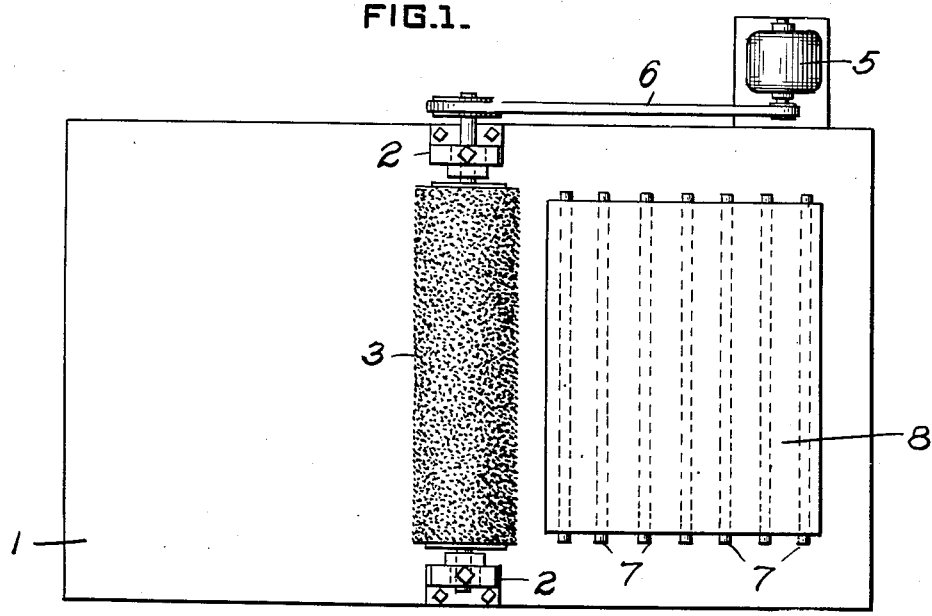
Figure 2:
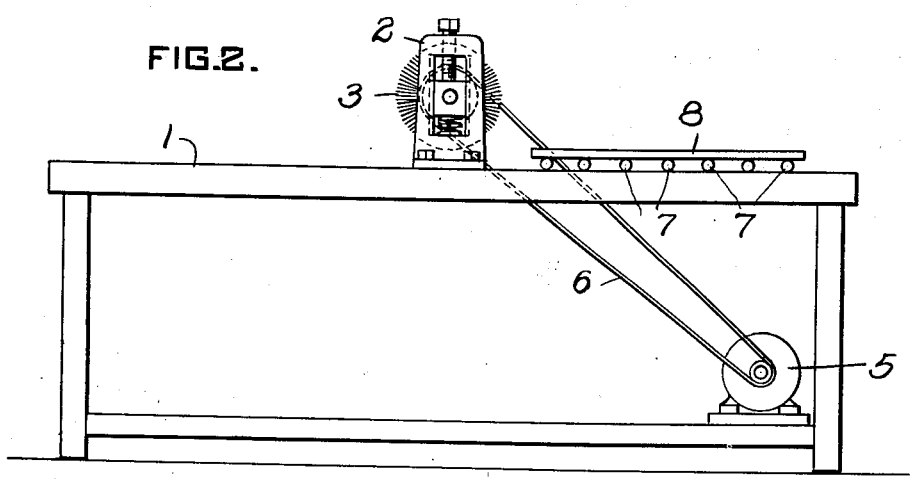
Figure 3:
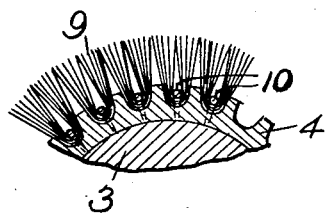

The invention relates to a process of polishing glass, the process being particularly directed to producing what is known as a semi-polish on Carrara glass, although not limited to the production of such a polish. The process may be practiced to produce the high polish required on ordinary plate glass or may be used as an intermediate step in the polishing of plate glass, the glass being ground and smoothed in the usual way, then given a semi-polish by my process and finally given a high polish by the use of the well known polishing apparatus now in use and comprising felt blocks employing a rouge polishing compound. The invention has for its objects, the provision of a process whereby the time and cost of polishing is reduced to a small fraction of that heretofore required and the provision of a process which will give a uniform semi-polish to the glass sheets operated upon. A simple form of apparatus for carrying out the process is illustrated in the accompanying drawings, wherein:

Figure 1 is a plan view of the apparatus and Fig. 2 is a side elevation thereof, and Fig. 3 is an enlarged section through a part of the brush.

In the production of Carrara glass it has always been customary to cast, grind and smooth the sheets in the same manner as plate glass, after which the glass was removed from the grinding tables and secured upon reciprocating polishing tables by means of plaster-of-Paris. The tables reciprocate beneath polishing blocks which rotate and also move laterally, these blocks having a felt surface and a mixture of rouge and water being used as a polishing medium. This polishing operation has ordinarily required about five hours, thus requiring a large expenditure of power and the use of large quantities of felt and rouge. The labor of handling the glass is also very considerable due to the fact that it must be securely cemented to the tables by means of plaster-of-Paris with the upper surface true, thus requiring a high degree of skill. The polish secured by this operation is one which is similar to that produced upon plate glass, and objection has been made at various times to the use of Carrara glass by reason of this high polish, which is relatively much greater than that produced upon marble, which is used for similar purposes. The present process is designed to reduce the power and labor costs and eliminate the necessity of securing the glass by cementing during the polishing operation. It is a further important object of the invention to produce a polish which is uniform but which is very much less than that produced by the procedure above described, such a finish being known as a semi-polish.

Many attempts have been made heretofore to secure a semi-polish upon Carrara glass, but such efforts have been in all cases more or less unsuccessful because of the lack of uniformity in the finish. It has been attempted to secure this semi-polish by stopping the polishing operation before a complete polish is secured, and such procedure does produce a semi-polish, but the polish so produced is not uniform over the entire sheet, and it is very difficult to secure the same polish on all sheets.

Another plan which has been tried in order to secure the semi-polish was the use of wood polishing blocks on the ordinary grinding runners after the grinding was completed, such runners being used in connection with suitable polishing powder. This procedure gave a semi-polish, but it was also non-uniform.

A third method which has been employed involves what is known as the "burning" of the glass surface. This is accomplished by polishing in the usual way but using putty powder instead of rouge and running the polishers relatively dry, thus securing a sort of burning or dulling effect, relieving the glass of its high polish. This process has been successful to a certain extent, but here again it is difficult or impossible to secure a uniform polish throughout the surface of the sheet. My present process overcomes the difficulty as to non-uniformity, giving a semi-polish which is uniform throughout, and one which can be imparted to the glass in a minute or fraction thereof instead of requiring several hours of polishing, as has been the case in all of the old processes wherein a semi-polish was attempted.

The process may be carried out on a large variety of machines and the invention is not limited to any particular type, the one illustrated in the drawing being of the simplest character, but serving to illustrate the principle of the invention and being capable of use in a most satisfactory manner. This machine comprises a table 1, having a flat top and provided with a pair of standards 2, in which the brush 3 is mounted for rotation and preferably made adjustable up and down to secure the desired pressure upon the glass fastened there beneath and to adjust the brush for wear. This brush is provided with a pulley 4 at its end driven directly from the electric motor 5 by means of the belt 6. A series of rollers 7 are provided upon the top of the table, such rollers being used to carry the sheet of glass 9 which is to be polished. The brush is rotated at a high rate of speed and the sheet of glass moves slowly along the surface of the table beneath the brush, the action of the brush upon the surface of the glass producing the desired polish.

The brush is preferably constructed as indicated in Fig. 3, having an outer wood sleeve 4, in which the brush elements 9 are secured. The surface of the sleeve 4 is provided with recesses into which the middle portions of the brush elements are fitted and secured by means of staples 10. This gives a very secure mounting of the brush elements which is particularly necessary in a brush of this type, which rotates at an exceedingly high speed. The brush elements 9 may be made of bristles, but are preferably made from wood or cane fiber, which is relatively hard and tough, in order to secure a maximum wearing period. The brush which I have used is about three feet long and about ten inches in diameter and has been driven at varying speeds from two hundred revolutions per minute (an approximate peripheral speed of 500 feet per minute) up to two thousand revolutions. Very rapid polishing is secured at a speed of nine hundred revolutions, although I prefer an even higher speed, ranging up to two thousand revolutions per minute, as the polishing effect is secured more rapidly and the sheet of glass may be carried beneath the brush more quickly at the higher rate of speed.

I have found that the degree of pressure between the brush and the sheet of glass is an important factor in securing a proper polish. The ends of the brush elements 9, in order to secure the best results, should only touch the surface of the sheet lightly, so that only the extreme ends of the brush elements strike the surface of the glass, and the action of such elements is one of impact with a limited period of contact with the glass as opposed to a wiping or rubbing action, such as would be the case if the brush were pressed down upon the glass and each brush element remained in contact therewith for a considerable period of travel. When the brush is pressed down too tightly upon the glass in the manner just described, the polishing action takes much longer and is not so uniform, the brush tending to produce a smearing or lining effect upon the glass.

The speed of translation of the glass beneath the brush may be regulated to secure the desired degree of polish, and if desired, the sheet may be fed back and forth beneath the brush a plurality of times. If the glass is exposed to the brush for sufficient period, a relatively high polish may be secured, approximating that of plate glass. This polishing effect may be further accentuated, if desired, by using a felt roller in connection with rouge as a polishing element, or the glass after partially polished by the brush, may be transferred to a regular plate glass polishing machine and given a final polish in the usual way, such final polish requiring only a fraction of the time which would be required if the plate had not been partially polished by the brush.

In securing the semi-polish, powdered pumice and water are preferably applied to the brush, although other polishing powders may be employed, such as putty powder or rouge, the latter polishing powders giving a higher polish but being less effective for quick polishing. As stated heretofore, the action of the brush elements upon the glass is one of impact, which is made effective by the polishing or abrading material, the brush elements striking the particles of material and causing them to impinge upon or rub over the minute upstanding irregularities on the glass surface and break or wear them away. The effectiveness of this action is dependent on the velocity of impact of the brush elements which drive the abrading or polishing particles against and across the surface of the glass at a high velocity, rather than upon the pressure exerted upon the glass, as is the case in the ordinary polishing operation, in which the felt with the rouge facing its surface is pressed tightly upon the glass, and exerts a powerful, but relatively slow acting pull upon such surface, dragging or smearing the upstanding particles into the pits and hollows. If desired, the sheet may be fed beneath a plurality of brushes supplied with polishing powders of varying degrees of effectiveness. Various means may also be employed for moving the glass sheets beneath the brushes, and such operation may obviously be done automatically rather than by hand. I have found that various types of brush elements may be satisfactorily used, the wood fiber elements being preferable, however, because of their cheapness and greater durability.

What I claim is:

1. A process of smoothing or polishing a glass sheet which consists in rotating a brush with its axis extending transversely of the sheet and having radially extending fibers with the ends of such fibers in contact with the sheet at a high rate of speed so that the fibers engage the sheet with an impact or whipping action, and supplying an abrading or polishing material to make such action effective to smooth or polish the glass.

2. A process of smoothing or polishing a glass sheet which consists in rotating a brush with its axis extending transversely of the sheet and having radially extending fibers with the ends of such fibers in contact with the sheet at a rate of speed upwards of 500 feet per minute at the periphery of the brush, so that the fibers engage the sheet with an impact or whipping action, and supplying an abrading or polishing material to make such action effective to smooth or polish the glass.

In testimony whereof, I have hereunto subscribed my name this 3rd day of November, 1919.

CHRISTOPHER BROWN.

Witnesses:
GEO. W. RISBECK,
RUTH HEUPEL.